United States Patent
Norberg et al.

(10) Patent No.: US 9,324,177 B2
(45) Date of Patent: *Apr. 26, 2016

(54) GENERATION OF INTERMEDIATE IMAGES FOR TEXTURE COMPRESSION

(71) Applicant: Zynga Inc., San Francisco, CA (US)

(72) Inventors: Nils Jonas Norberg, San Francisco, CA (US); Sulabh Patel, San Mateo, CA (US); James Ho, Mill Valley, CA (US); Szymon Swistun, Belmont, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,506

(22) Filed: Feb. 13, 2015

(65) Prior Publication Data

US 2015/0154789 A1 Jun. 4, 2015

Related U.S. Application Data

(63) Continuation of application No. 13/783,760, filed on Mar. 4, 2013.

(51) Int. Cl.
| | |
|---|---|
| *G06T 15/00* | (2011.01) |
| *G06T 15/04* | (2011.01) |
| *G06T 9/00* | (2006.01) |

(52) U.S. Cl.
CPC .. *G06T 15/04* (2013.01); *G06T 9/00* (2013.01)

(58) Field of Classification Search
CPC ........... G06T 9/00; G06T 9/004; G06T 9/008; G06T 15/04; H04N 19/00775
See application file for complete search history.

(56) References Cited

U.S. PATENT DOCUMENTS

| | | | | |
|---|---|---|---|---|
| 6,683,979 B1 * | 1/2004 | Walker | ..... | G06T 9/005 |
| | | | | 358/539 |
| 7,796,823 B1 * | 9/2010 | Budagavi | ..... | G06T 9/00 |
| | | | | 382/232 |

(Continued)

OTHER PUBLICATIONS

"U.S. Appl. No. 13/783,760, Notice of Allowance mailed Dec. 3, 2014", 9 pgs.

*Primary Examiner* — Jingge Wu
(74) *Attorney, Agent, or Firm* — Schwegman Lundberg & Woessner, P.A.

(57) ABSTRACT

A machine may be configured to process an uncompressed image to obtain a set of intermediate images, which may be alternatively known as working images or temporary images. Such a set of intermediate images may be used as input for an image compression algorithm that, when executed by the machine or other compression engine, outputs a compressed version of the uncompressed image. For example, a compression format called "PVRTC," which may be used on certain portable devices, accepts a set of three intermediate images as input, specifically, one full resolution, low precision version of the original uncompressed image, plus two low resolution, low frequency color versions of the original uncompressed image. A set of intermediate images for such a compression format may be generated by the machine from the original uncompressed image.

20 Claims, 9 Drawing Sheets

(56) References Cited

U.S. PATENT DOCUMENTS

| | | | | |
|---|---|---|---|---|
| 8,625,910 B2 * | 1/2014 | Uro | | G06T 9/00 382/232 |
| 2004/0041820 A1 * | 3/2004 | Sevigny | | G06T 1/00 345/619 |
| 2006/0188144 A1 * | 8/2006 | Sasaki | | G06K 9/00281 382/154 |
| 2007/0269118 A1 * | 11/2007 | Sasaki | | H04N 19/70 382/232 |
| 2008/0055331 A1 * | 3/2008 | Iourcha | | G06T 9/00 345/582 |
| 2009/0147020 A1 * | 6/2009 | Sellers | | H04N 9/642 345/603 |
| 2009/0154803 A1 * | 6/2009 | Mizukura | | H04N 1/6058 382/166 |
| 2010/0328425 A1 * | 12/2010 | Nagaraj | | G06T 9/001 348/42 |
| 2014/0050414 A1 * | 2/2014 | Strom | | G06T 9/00 382/238 |
| 2014/0247982 A1 | 9/2014 | Norberg et al. | | |

* cited by examiner

First Phase

Second Phase

Generation of Pixel 462 in Sixth Image 460

GENERATION OF INTERMEDIATE IMAGES FOR TEXTURE COMPRESSION

RELATED APPLICATION

This application is a continuation of U.S. patent application Ser. No. 13/783,760, filed on Mar. 4, 2013, which is incorporated by reference herein in its entirety.

TECHNICAL FIELD

The subject matter disclosed herein generally relates to the processing of data. Specifically, the present disclosure addresses computer graphic images (CGI), as well as systems and methods to facilitate generation of images (e.g., intermediate images for texture compression).

BACKGROUND

A machine may be configured (e.g., by suitable software) to perform compression of one or more images. In image compression, an uncompressed image is processed (e.g., by the machine) to obtain the compressed image. This image processing may include application of one or more algorithms to the uncompressed image. As an example, one such algorithm for image compression is called "JPEG," after the Joint Photographic Experts group which standardized the algorithm. As another example, Graphics Interchange Format (GIF) is a data format for storing images in files, and this format testifies that images be compressed using a compression algorithm called "Lempel-Ziv-Welch (LZW)."

One type of image is called a "texture map" or simply a "texture." A texture map is an image that is applicable (e.g., mappable) to a surface of a two-dimensional or three-dimensional object (e.g., an object that is represented in a virtual space by wireframe model that includes one or more polygons). As images, texture maps may be compressed using one or more image compression techniques to obtain compressed textures that are more easily stored in a database or more quickly communicated over a network.

BRIEF DESCRIPTION OF THE DRAWINGS

Some embodiments are illustrated by way of example and not limitation in the figures of the accompanying drawings.

DETAILED DESCRIPTION

Figure 1:
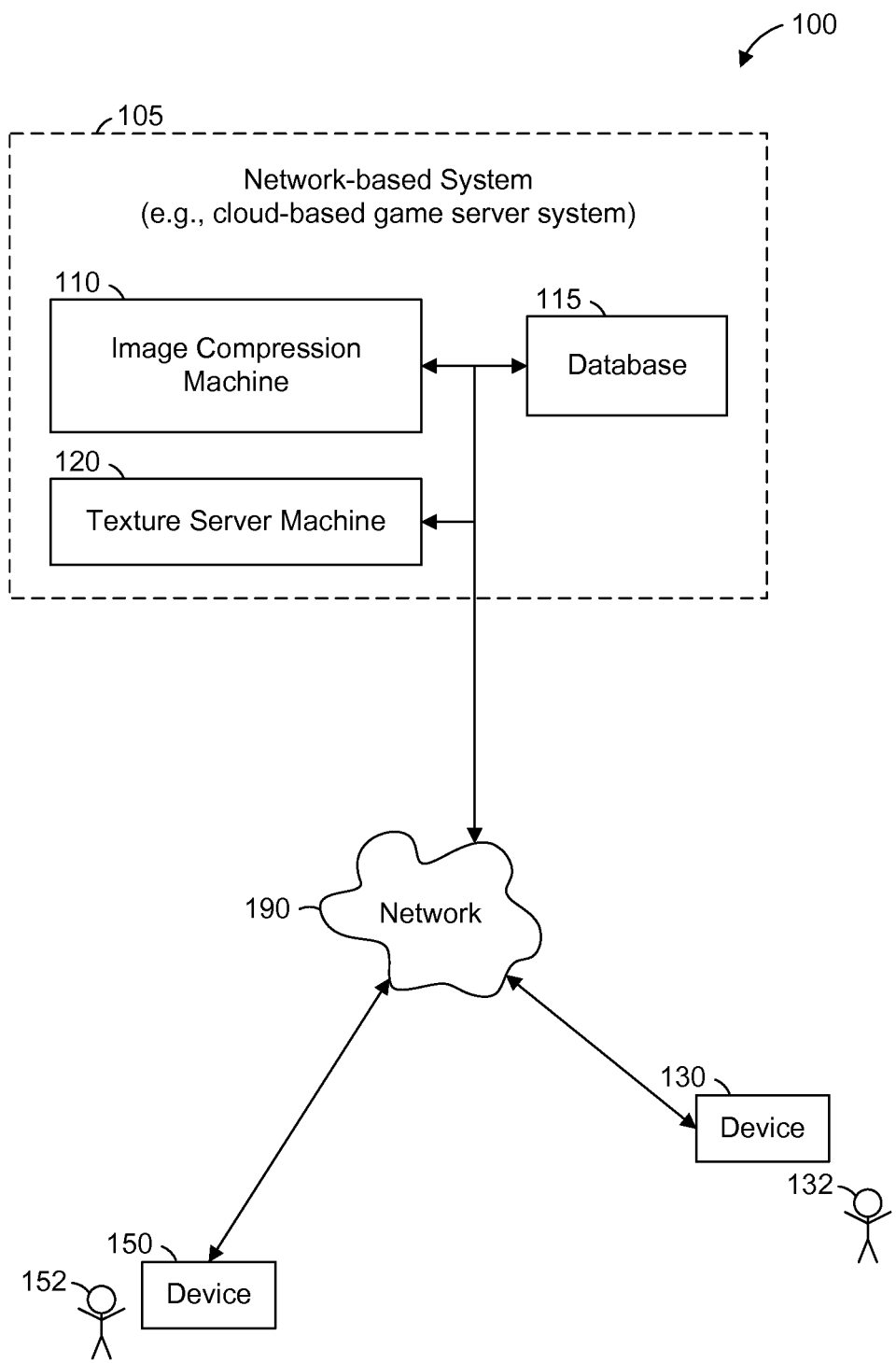
FIG. 1 is a network diagram illustrating a network environment suitable for generation of intermediate images (e.g., for texture compression), according to some example embodiments.

Example methods and systems are directed to generation of intermediate images (e.g., for texture compression). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., a computer or other processing device) may be configured (e.g., by one or more special-purpose software modules) to process an uncompressed image to obtain a set of intermediate images (e.g., working images or temporary images). Such a set of intermediate images may be used as input for an image compression algorithm that, when executed (e.g., by the machine), outputs a compressed version of the uncompressed image. For example, a compression format called "PowerVR Texture Compression (PVRTC)," which may be used on certain portable devices (e.g., smart phones, tablet computers, and media players, such as iPhone®, iPod Touch®, and iPad® by Apple Inc.®), accepts a set of three intermediate images as input, specifically, one full resolution, low precision version of the original uncompressed image, plus two low resolution, low frequency color versions of the original uncompressed image. A set of intermediate images for such a compression format may be generated by the machine from the original uncompressed image.

In particular, the machine (e.g., an image compression machine) may be configured to implement a two-phase procedure to generate intermediate images that are usable as input data for PVRTC compression or some other compression algorithm or format that accepts such intermediate images as input data. Although the discussion herein uses the phrase "intermediate image" for purposes of clarity, various example embodiments of the machine may store the data of any given intermediate image as an image (e.g., in memory) or in any other suitable data structure (e.g., array). For example, the machine need not actually store the data in an image file or display the data on a screen.

In the first phase of this two-phase procedure, the machine (e.g., a PVRTC texture compression machine) may generate a first set of intermediate images. This first set may include the following five images: (1) a full resolution image representing luminance values of pixels in the original uncompressed image, (2) a low resolution image representing minimum luminance values of blocks of pixels (e.g., pixel blocks) in the original uncompressed image, (3) a low resolution image representing maximum luminance values of the blocks of pixels, (4) a low resolution image representing colors of pixels with minimum luminance in each of the blocks, and (5) a low resolution image representing colors of pixels with maximum luminance in each of the blocks.

In the second phase of this two-phase procedure, the machine may generate a second set of intermediate images. This second set may include the following three images: (A) a full resolution image representing quantized luminance values that correspond to pixels within the full resolution image that represents luminance values of the pixels in the original uncompressed image, (B) the low resolution image that represents the colors of the pixels with minimum luminance in each of the blocks (e.g., from the first set of intermediate images), and (C) the low resolution image that represents the colors of the pixels with maximum luminance in each of the blocks (e.g., from the first set of intermediate images).

According to various example embodiments, the machine may provide this second set of intermediate images to a compression engine (e.g., a compression module executing on the machine or on another machine). This compression engine may be configured to accept the second set of intermediate images as input to a compression algorithm (e.g., PVRTC) and output a compressed version of the original uncompressed image (e.g., in PVRTC format).

FIG. 1 is a network diagram illustrating a network environment 100 suitable for generation of intermediate images (e.g., for texture compression), according to some example embodiments. The network environment 100 includes an image compression machine 110, a database 115, a texture server machine 120, and devices 130 and 150, all communicatively coupled to each other via a network 190. The image compression machine 110, the database 115, the texture server machine, and the devices 130 and 150 may each be implemented in a computer system, in whole or in part, as described below with respect to FIG. 9.

The image compression machine 110 may be configured (e.g., by one or more special-purpose software modules) to perform one or more image processing operations, including one or more operations to facilitate generation of intermediate images (e.g., for texture compression). Intermediate images generated by the image compression machine 110 may be stored by the database 115. In some example embodiments, the image compression machine 110 includes a compression module (e.g., an image compression engine), while in alternative example embodiments, the texture server machine 120 includes a compression engine.

Compressed images (e.g., a compressed version of an uncompressed image) may be stored in the database 115 and may be provided (e.g., serve) to one or more devices (e.g., devices 130 and 150) by the texture server machine 120. For example, the texture server machine 120, with or without the image compression machine 110 and the database 115, may form all or part of the network-based system 105 that provides compressed images (e.g., compressed textures) as a network-based service to one or more devices (e.g., device 130). In some example embodiments, the network-based system 105 forms all or part of a cloud-based game server system that provides game software (e.g., gaming applications, applets, or mobile apps) to one or more devices (e.g., device 130).

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the image compression machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
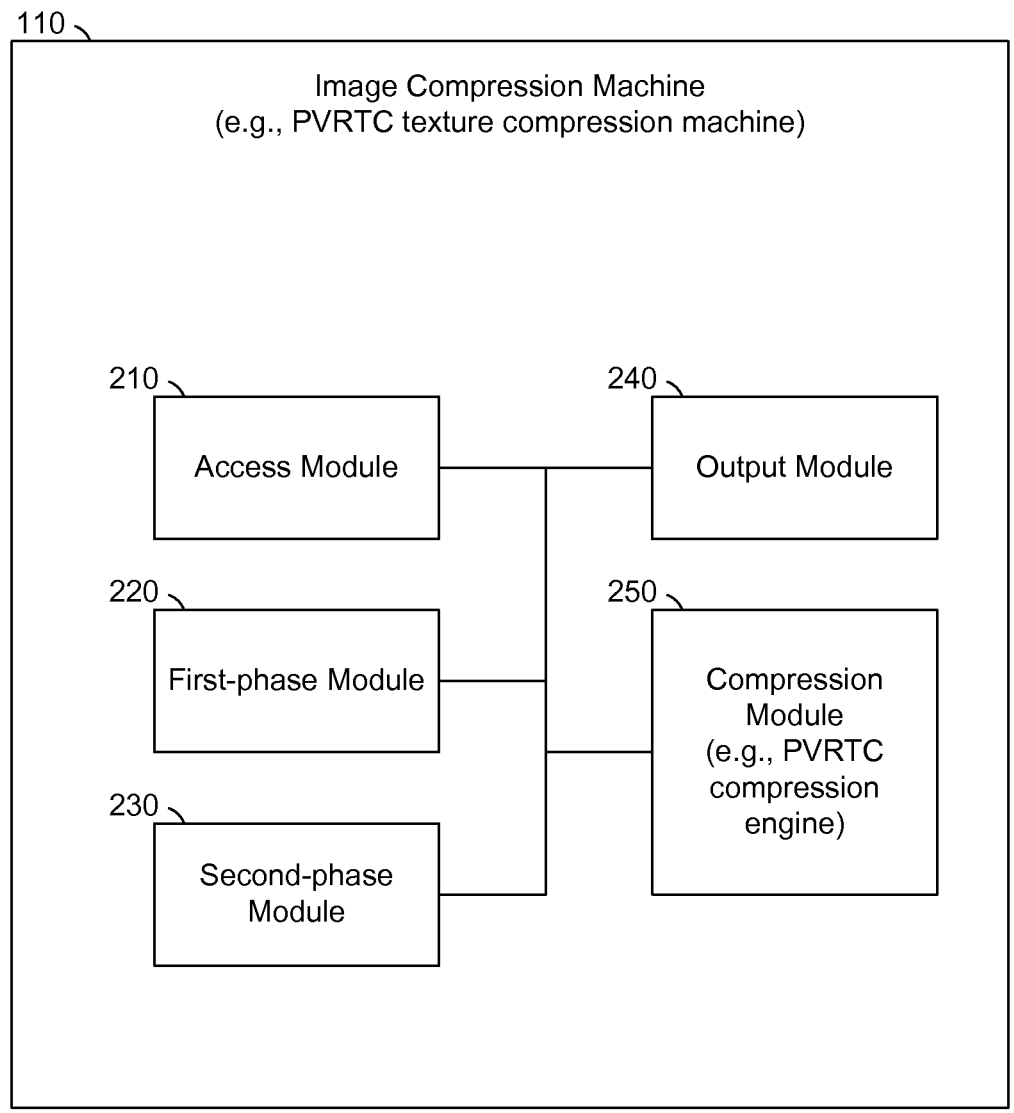
FIG. 2 is a block diagram illustrating components of an image compression machine that is suitable for generation of intermediate images, according to some example embodiments.

FIG. 2 is a block diagram illustrating components of the image compression machine 110, according to some example embodiments. The image compression machine 110 is shown as including an access module 210, a first-phase module 220, the second-phase module 230, and an output module 240, all configured to communicate with each other (e.g., via a bus, shared memory, or a switch). In some example embodiments, the image compression machine 110 is configured as a texture compression machine (e.g., a PVRTC texture compression machine), and in such example embodiments, the image compression machine 110 may also include a compression module 250 (e.g., a PVRTC compression engine configured to output a PVRTC compressed image based on a set of intermediate images).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
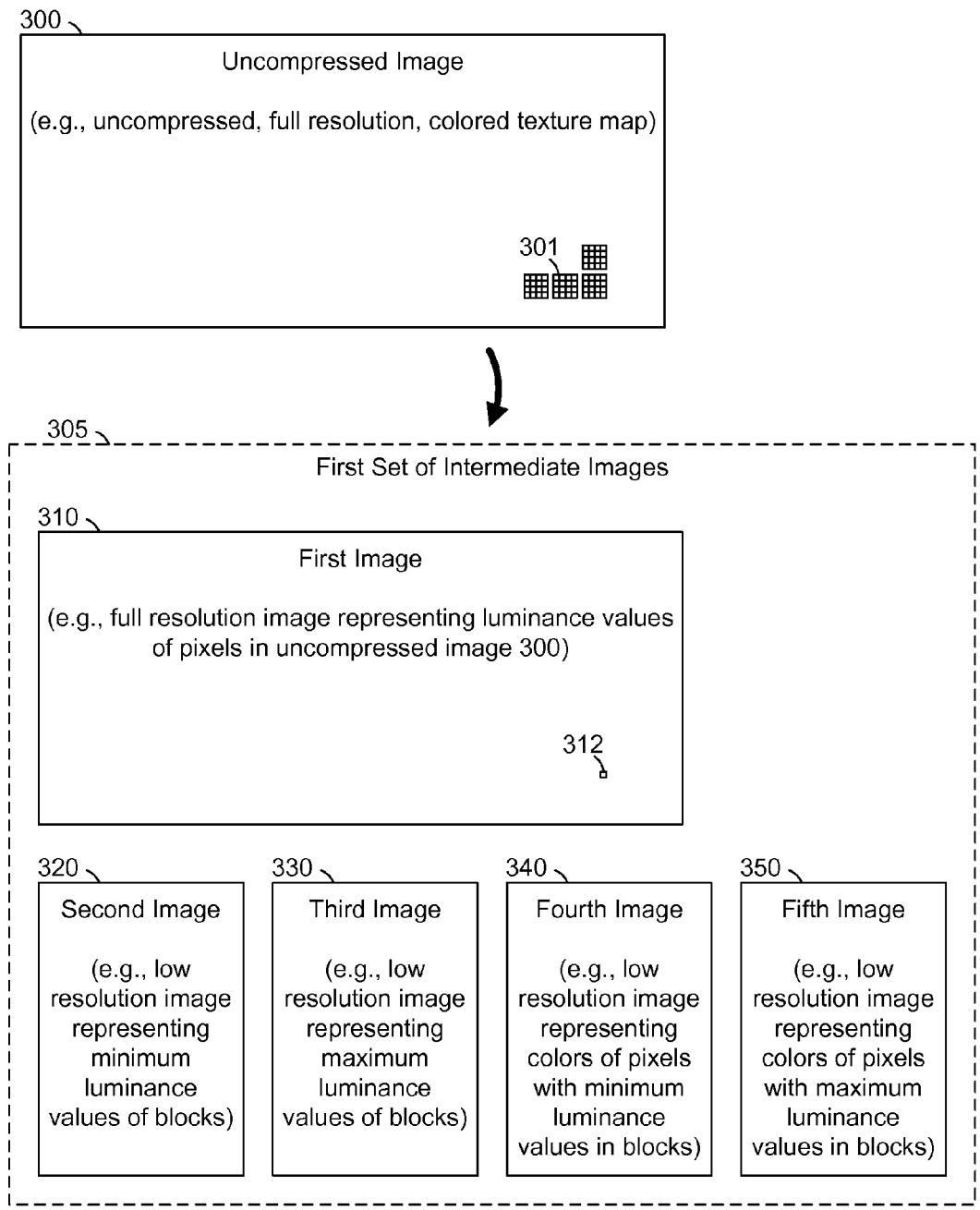
FIG. 3 is a conceptual diagram illustrating a first phase of a procedure to generate intermediate images, according to some example embodiments.

FIG. 3 is a conceptual diagram illustrating a first phase of a procedure to generate intermediate images from an uncompressed image 300 (e.g., for subsequent generation of a compressed version of the uncompressed image 300), according to some example embodiments. The uncompressed image 300 may be an uncompressed, full resolution, color or monochrome image (e.g., a full-size color texture map). As shown in FIG. 3, the uncompressed image 300 may include multiple blocks of pixels (e.g., pixel blocks). Among these blocks is a block 301 of pixels (e.g., a 4×4 block of pixels). Although these blocks of pixels may be of any uniform or non-uniform size, certain example embodiments of the image compression machine 110 are configured to work with uniform 4 pixel×4 pixel blocks (e.g., 4×4 blocks).

As shown by the curved arrow in FIG. 3, a first set 305 of intermediate images may be generated based on (e.g., from) the uncompressed image 300. FIG. 3 depicts five images being included in this generated first set 305, specifically, a first image 310, a second image 320, a third image 330, a fourth image 340, and a fifth image 350.

The first image 310 may be a full resolution, monochromatic image that represents luminance values of pixels in the uncompressed image 300. That is, for every pixel in the uncompressed image 300, there is a corresponding value (e.g., a value treated as a pixel) in the first image 310, and that value in the first image 310 may represent the luminance value (e.g., grayscale value or brightness value) of the corresponding pixel in the uncompressed image 300. Accordingly, the first image 310 may be generated based on all of the pixels in the uncompressed image 300. As shown in FIG. 3, the first image 310 includes a pixel 312, which may represent the luminance value of the corresponding pixel in the uncompressed image 300 (e.g., one of the pixels within the block 301 of pixels).

The second image 320 may be a low resolution image that represents a minimum luminance value of each block of pixels in the uncompressed image 300 (e.g., block 301). That is, for every block of pixels in the uncompressed image 300, there is a corresponding value (e.g., a value treated as a pixel) in the second image 320, and that value in the second image 320 may represent the minimum luminance value within that block of pixels (e.g., the luminance value of the pixel having the lowest luminance in the block). Accordingly, the second image 320 may be generated based on all of the blocks of pixels in the uncompressed image 300.

The third image 330 may be a low resolution image that represents a maximum luminance value for each block of pixels in the uncompressed image 300 (e.g., block 301). That is, for every block of pixels in the uncompressed image 300, there is a corresponding value (e.g., value treated as a pixel) in the third image 330, and that value in the third image 330 may represent the maximum luminance value within that block of pixels (e.g., a luminance value of the pixel having the highest luminance in the block). Accordingly, the third image 330 may be generated based on all of the blocks of pixels in the uncompressed image 300.

The fourth image 340 may be a low resolution image that represents colors of pixels that have minimum luminance values in each pixel block within the uncompressed image 300 (e.g., block 301). That is, for every block of pixels in the uncompressed image 300, there are one or more corresponding values (e.g., a single value, a value pair, or a triplet, treated as a pixel) in the fourth image 340, and these one or more corresponding values in the fourth image 340 may represent the color of the pixel with the minimum luminance value within that block. Accordingly, the fourth image 340 may be generated based on all of the blocks of pixels in the uncompressed image 300.

The fifth image 350 may be a low resolution image that represents colors of pixels that have maximum luminance values in each pixel block within the uncompressed image 300 (e.g., block 301). That is, for every block of pixels in the uncompressed image 300, there are one or more corresponding values (e.g., a single value, a value pair, or a triplet, treated as a pixel) in the fifth image 350, and these one or more corresponding values in the fifth image 350 may represent the color of the pixel with the maximum luminance value within that block. Accordingly, the fifth image 350 may be generated based on all of the blocks of pixels in the uncompressed image 300.

Figure 4:
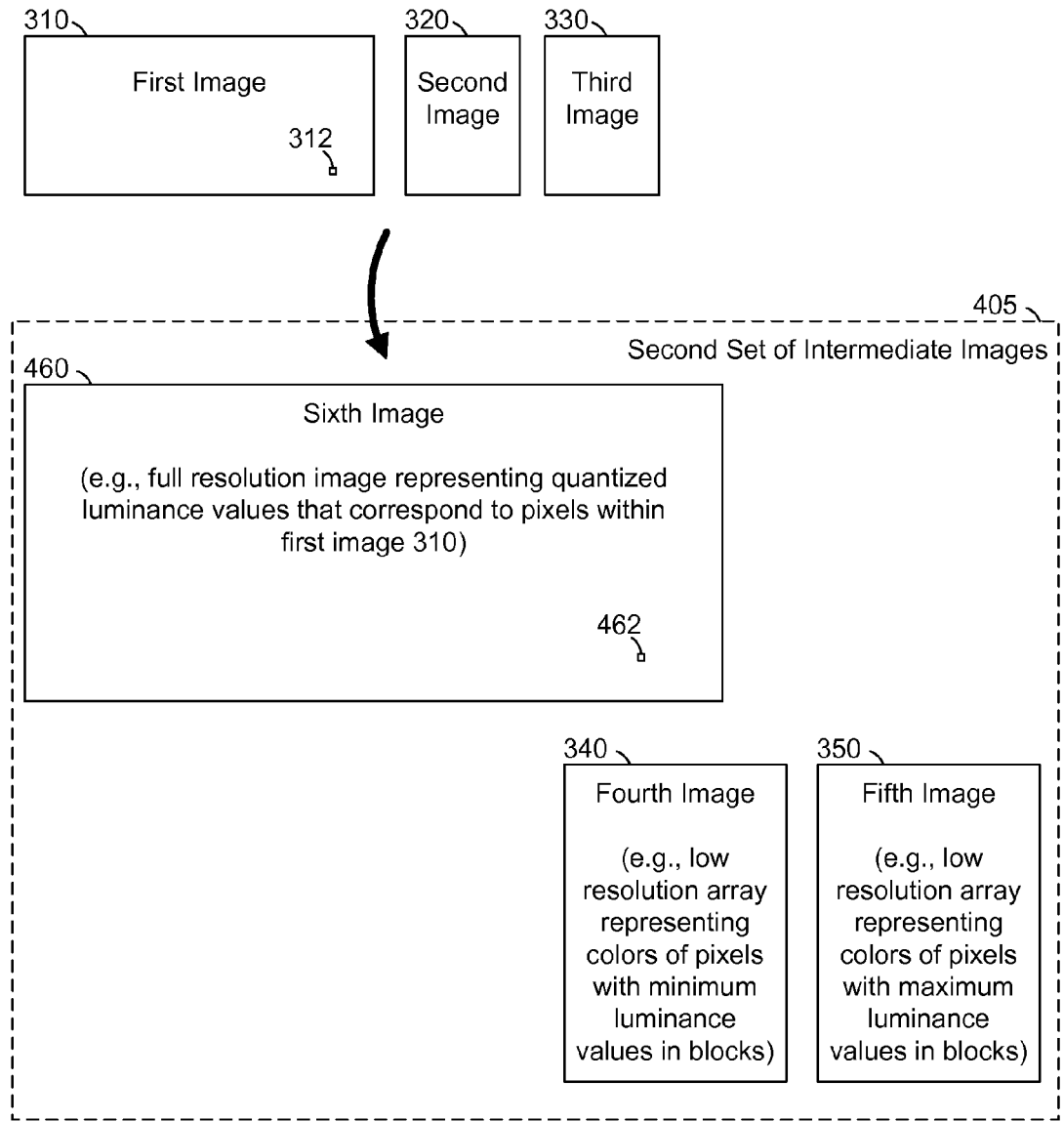
FIG. 4 is a conceptual diagram illustrating a second phase of the procedure to generate intermediate images, according to some example embodiments.

FIG. 4 is a conceptual diagram illustrating a second phase of the procedure to generate intermediate images from the uncompressed image 300 (e.g., for subsequent production of a compressed version of the uncompressed image 300), according to some example embodiments. As noted above, the first image 310, the second image 320, and the third image 330 may be generated based on the uncompressed image 300.

As shown by the curved arrow in FIG. 4, a sixth image 460 may be generated based on (e.g., from) the first image 310, the second image 320, and the third image 330. The sixth image 460 may be included in a second set 405 of intermediate images (e.g., generated or provided by the image compression machine 110). The second set 405 is shown as also including the fourth image 340 and the fifth image 350, which were previously generated in the first phase of this procedure, as discussed above with respect to FIG. 3.

The sixth image 460 may be a full resolution image that represents quantized luminance values that correspond to pixels within the first image 310. That is, for every pixel within the first image 310 (e.g., pixel 312), there is a corresponding value (e.g., treated as a pixel 462) in the sixth image 460, and that value in the sixth image 460 may represent a quantized (e.g., posterized or bit-reduced) luminance value of the corresponding pixel in the first image 310 (e.g., pixel 312). Further details of this quantization process, according to various example embodiments, are provided below with respect to FIG. 5.

After generation of the sixth image 460, the image compression machine 110 may package the fourth image 340, the fifth image 350, and the sixth image 460 into the second set 405 of intermediate images. Image compression machine 110 may then provide this packaged second set 405 of intermediate images to a compression module (e.g., compression module 250), which may be executing on the image compression machine 110 or elsewhere (e.g., on the texture server machine 120).

Figure 5:
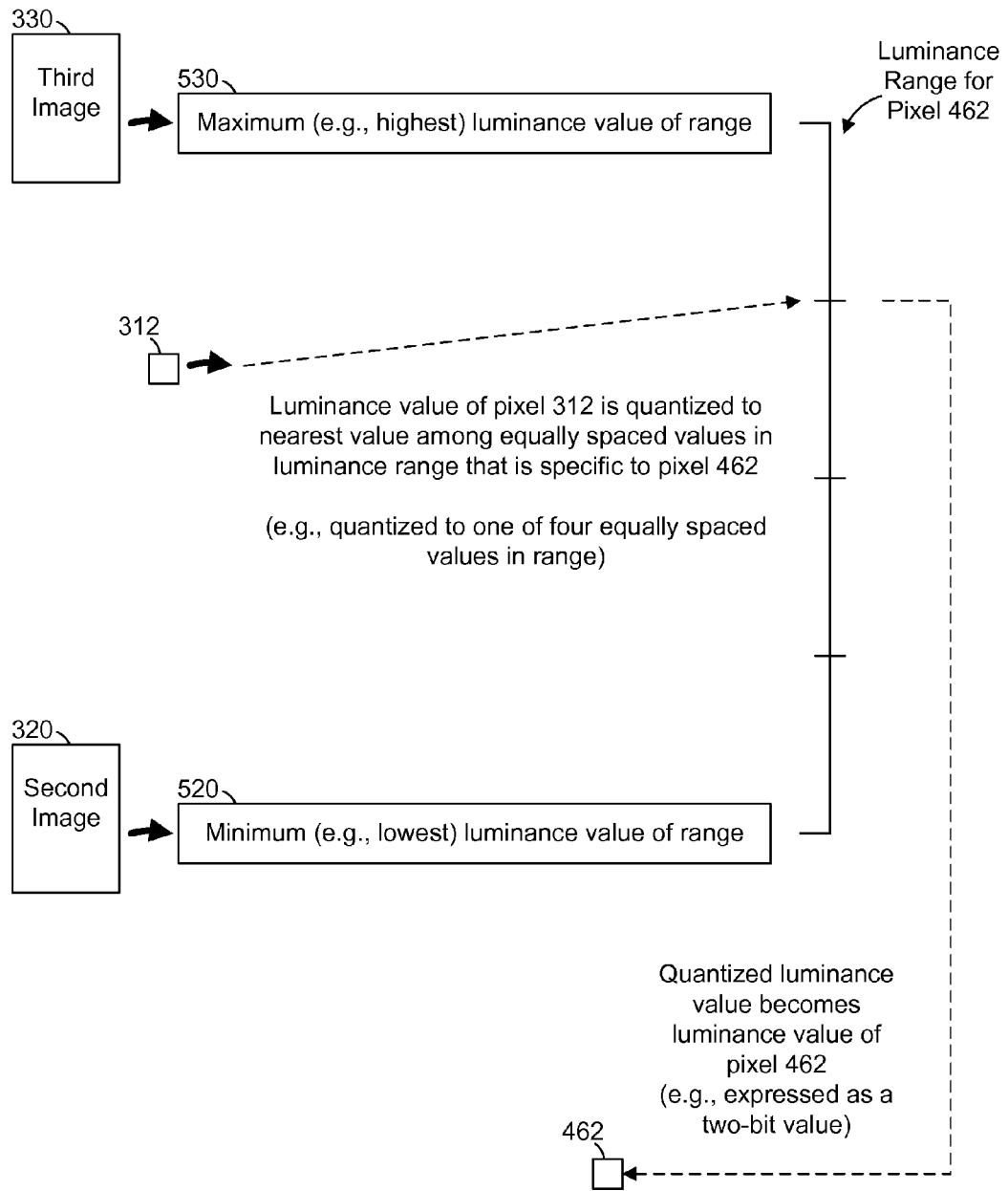
FIG. 5 is a conceptual diagram illustrating pixel generation within the second phase of the procedure to generate intermediate images, according to some example embodiments.

FIG. 5 is a conceptual diagram illustrating generation of the pixel 462 in the sixth image 460 as part of generating the second set 405 of intermediate images (e.g., for subsequent creation of a compressed version of the uncompressed image 300), according to some example embodiments. The procedure for generating the pixel 462 based on the pixel 312 may be applied to each pixel in the first image 310 to generate a corresponding pixel in the sixth image 460.

As shown in FIG. 5, the pixel 462 to be generated has a luminance range that is specific to the pixel 462. This luminance range corresponds to the pixel 462, and this luminance range has a minimum luminance value 520 (e.g., a lowest luminance value available for the pixel 462) and a maximum luminance value 530 (e.g., a highest luminance value available for the pixel 462).

As shown by a curved arrow, the minimum luminance value 520 in the range may be determined based on (e.g., from) the second image 320 (e.g., the low resolution image that represents minimum luminance values of the pixel blocks in the uncompressed image 300). The image compression machine 110 may determine the minimum luminance value 520 based on one or more minimum luminance values represented in the second image 320 (e.g., based on a linear combination of two or more minimum luminance values).

In greater detail, the pixel 312 is part of the block 301, whose minimum luminance value is represented in the second image 320. Accordingly, the minimum luminance value 520 may be determined by combining two or more "neighboring" minimum luminance values that correspond to pixel blocks adjacent to the block 301, as represented in the second image 320.

For example, the image compression machine 110 may linearly combine four neighboring minimum luminance values (e.g., from pixel blocks above the block 301, below the block 301, to the right of the block 301, and to the left of the block 301). As another example, the image compression machine 110 may linearly combine two neighboring minimum luminance values (e.g., from pixel blocks diagonally above and left of the block 301, and diagonally below and right of the block 301).

As shown by another curved arrow, the maximum luminance value 530 and the range may be determined based on the third image 330 (e.g., the low resolution image that represents maximum luminance values of the pixel blocks in the uncompressed image 300). The image compression machine 110 may determine the maximum luminance value 530 based on one or more maximum luminance values represented in the third image 330 (e.g., based on a linear combination of two or more maximum luminance values).

In greater detail, the pixel 312 is part of the block 301, whose maximum luminance value is represented in the third image 330. Accordingly, the maximum luminance value 530 may be determined by combining two or more "neighboring" maximum luminance values that correspond to pixel blocks adjacent to the block 301, as represented in the third image 330.

For example, the image compression machine 110 may linearly combine four neighboring maximum luminance values (e.g., from pixel blocks above the block 301, below the block 301, to the right of the block 301, and to the left of the block 301). As another example, the image compression machine 110 may linearly combine two neighboring maximum luminance values (e.g., from pixel blocks diagonally above and left of the block 301, and diagonally below and right of the block 301).

As shown by a further curved arrow, the luminance value of the pixel 312 may be quantized to a nearest value among values that subdivide the range. For example, the range may be subdivided into equally spaced values (e.g., four equally spaced values), and the luminance value of the pixel 312 may be quantized to the nearest of those equally spaced values. This quantization is indicated by dashed lines with arrowheads. Accordingly, the quantized luminance value of the pixel 312 in the first image 310 may become the luminance value of the pixel 462 in the sixth image 460. In some example embodiments, the luminance value of the pixel 462 may be expressed as a two-bit value (e.g., for purposes of data reduction, data compression, or performance of the image compression machine 110).

Since the sixth image 460 may be monochromatic (e.g., grayscale), it may be sufficient to determine just the luminance value of each pixel (e.g., pixel 462) in the sixth image 460. The remainder of the pixels in the sixth image 460 may be processed in a manner similar to that described herein for the pixel 462.

Figure 6:
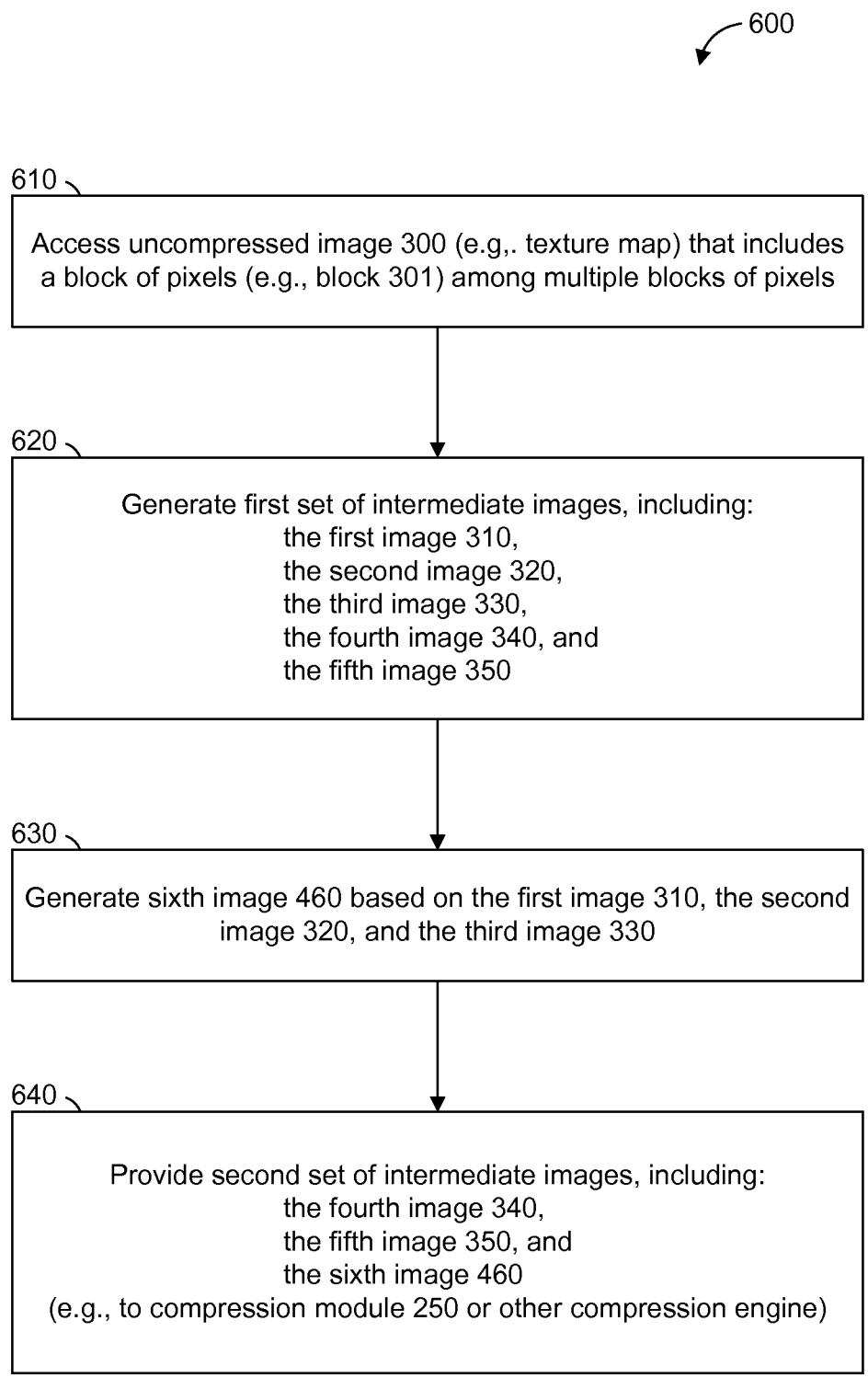
FIG. 6-8 are flowcharts illustrating operations of the image compression machine in performing a method of generating intermediate images (e.g., for texture compression), according to some example embodiments.
Figure 7:
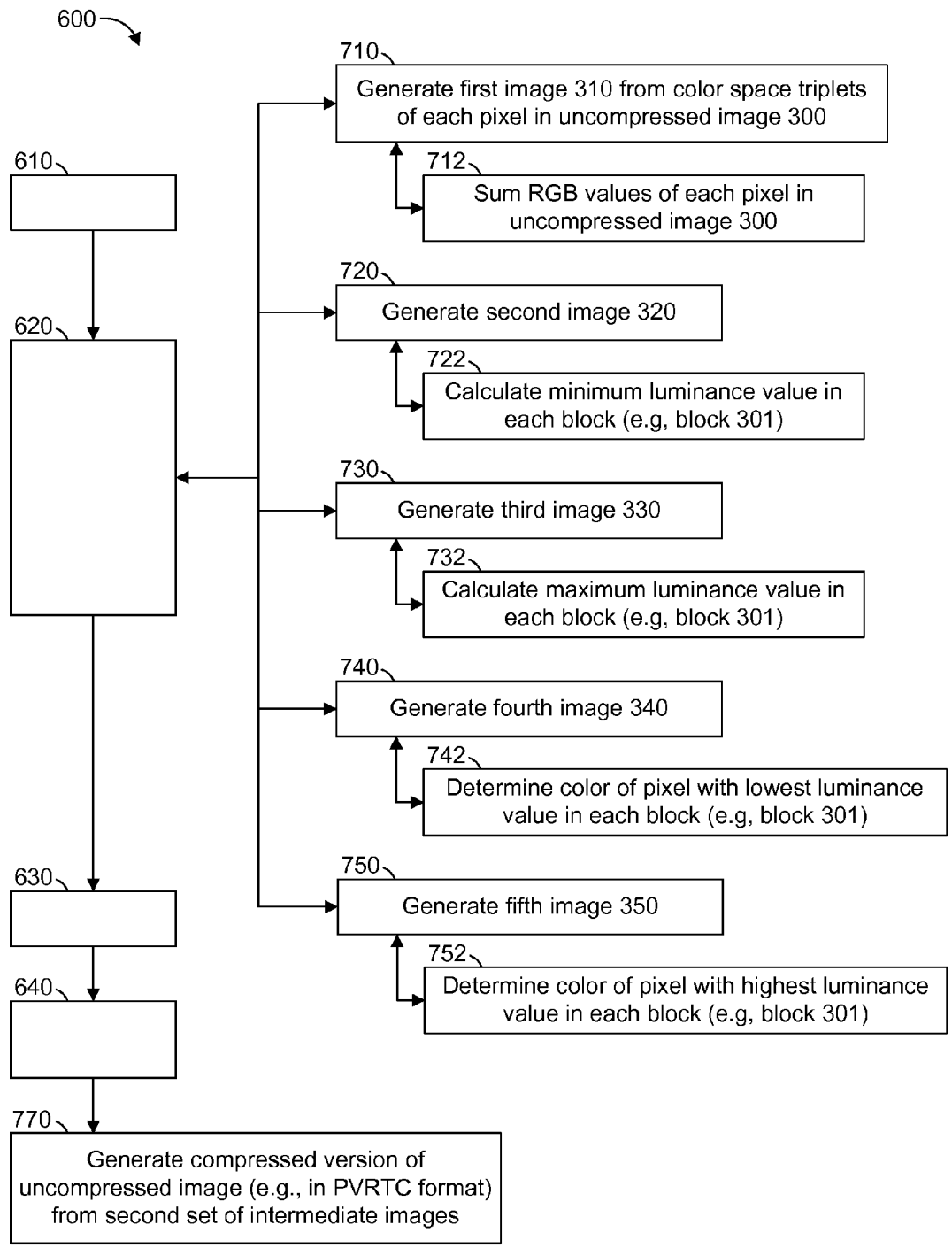
Figure 8:
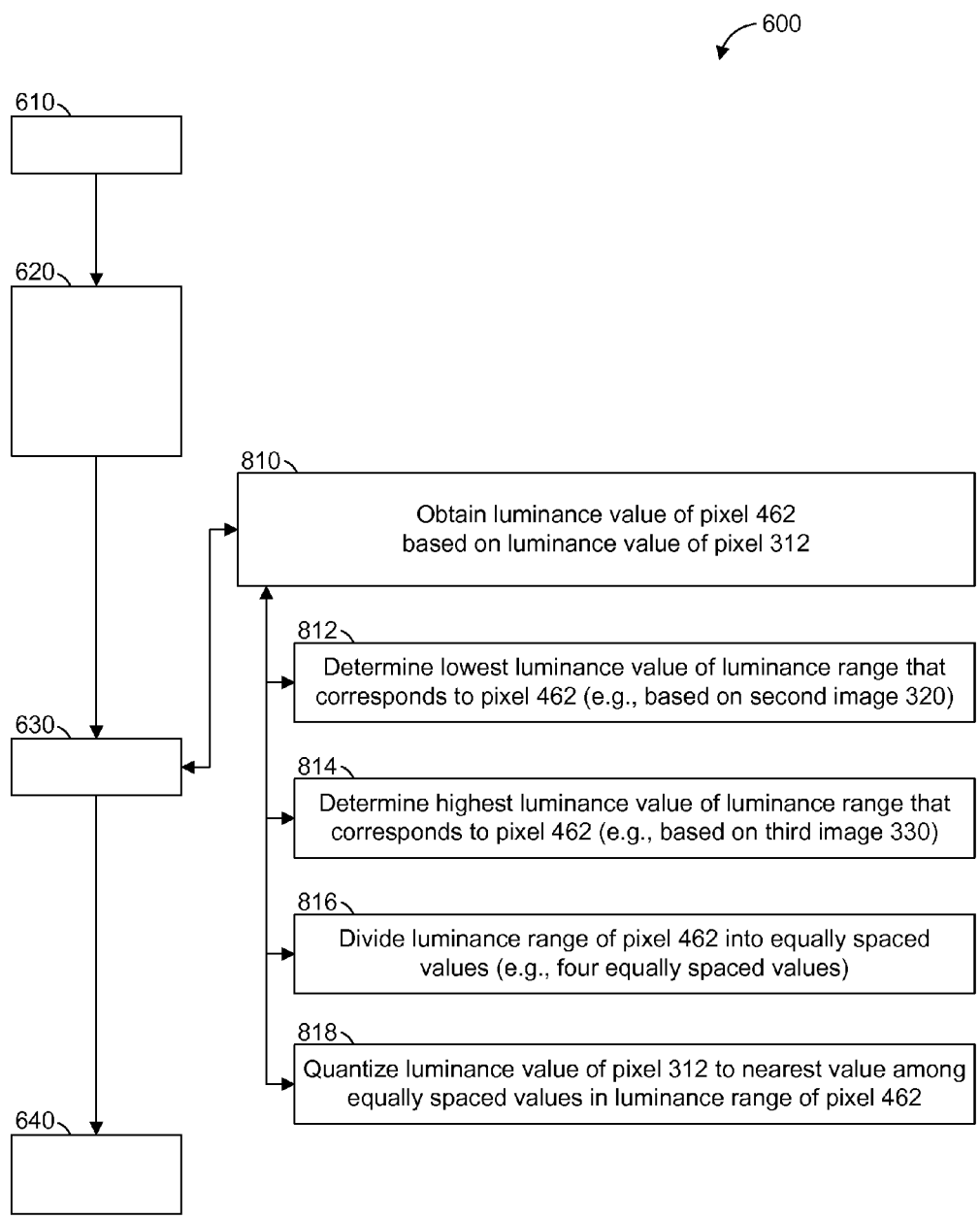

FIG. 6-8 are flowcharts illustrating operations of the image compression machine 110 in performing a method 600 of generating intermediate images (e.g., for texture compression), according to some example embodiments. Operations in the method 600 may be performed by the image compression machine 110, using modules described above with respect to FIG. 2. As shown in FIG. 6, the method includes operation 610, 620, 630, and 640.

In operation 610, the access module 210 accesses the uncompressed image 300 that includes the block 301 of pixels among multiple blocks of pixels. In some example embodiments, the uncompressed image 300 may be stored in the database 115 and accessed from the database 115.

In operation 620, the first-phase module 220 generates the first set 305 of intermediate images. The first set 305 may include one or more of the first image 310, the second image 320, the third image 330, the fourth image 340, and the fifth image 350, which are described above with respect to FIG. 3.

In operation 630, the second-phase module 230 generates the sixth image 460. Generation of the sixth image 430 may be based on one or more of the first image 310, the second image 320, and the third image 330, as described above with respect to FIGS. 4 and 5.

In operation 640, the output module 240 packages and provides the second set 405 of intermediate images. The second set 405 may include one or more of the sixth image 460, the fourth image 340, and the fifth image 350, as described above with respect to FIG. 4. In some example embodiments, the output module 240 provides the second set 405 to the compression module 250 (e.g., a compression engine executing on the image compression machine 110). In certain example embodiments, the output module 240 provides the second set 405 to a compression engine executing elsewhere (e.g., executing on the texture server machine 120). The second set 405 is usable to generate a compressed version of the uncompressed image 300 and therefore may be provided to a compression engine as input data for that compression engine. In various example embodiments, the output module 240 stores the second set 405 in the database 115. In other example embodiments, the output module 240 provides the second set to the device 130 (e.g., to a compression engine executing thereon).

As shown in FIG. 7, the method 600 may include one or more of operations 710, 720, 730, 740, 750, and 770. One or more of operations 710, 720, 730, 740, and 750 may be performed as part (e.g., a precursor task, a subroutine, or portion) of operation 620, in which the first-phase module 220 generates the first set 305 of intermediate images.

In operation 710, the first-phase module 220 generates the first image 310 based on (e.g., from) the uncompressed image 300. Since the uncompressed image 300 may be a color image, pixels in the uncompressed image 300 (e.g., a pixel within the block 301 of pixels) may be represented as a triplet of color space values (e.g., a color space triplet), and generation of the first image 310 may be based on one or more of such triplets. For example, a pixel in the uncompressed image 300 may be represented by a triplet of three RGB values (e.g., a red value, a green value, and a blue value). As another example, such a pixel may be represented by a color space triplet of CMY values (e.g., a cyan value, a magenta value, and a yellow value).

In situations where a pixel in the uncompressed image 300 is represented as a triplet of RGB color space values, operation 712 may be performed as part (e.g., a precursor task, a subroutine, or a portion) of operation 710, in which the first-phase module 220 generates the first image 310. In operation 712, the first-phase module 220 sums the RGB values of the pixel in the uncompressed image 300 (e.g., to determine the luminance value of the pixel in the uncompressed image 300). For example, the first-phase module 220 may add the red value of the pixel, the green value of the pixel, and the blue value of the pixel together to determine the luminance value of the corresponding pixel in the first image 310 (e.g., pixel 312). According to some example embodiments, each pixel in the uncompressed image 300 may be processed in this matter.

In operation 720, the first-phase module 220 generates the second image 320 based on the uncompressed image 300. As noted above, the second image 320 may be a low resolution image that represents a minimum luminance value of each block (e.g., block 301) in the uncompressed image 300. Operation 720 therefore may include calculation of the minimum luminance value for each pixel block in the uncompressed image 300. Such a calculation is shown in FIG. 7 as operation 722, which may be performed as part of operation 720.

In operation 730, the first-phase module 220 generates the third image 330 based on the uncompressed image 300. As noted above, the third image 330 may be a low resolution image that represents a maximum luminance value of each block (e.g., block 301) in the uncompressed image 300. Operation 730 therefore may include calculation of the maximum luminance value for each pixel block in the uncompressed image 300. Such a calculation is shown in FIG. 7 as operation 732, which may be performed as part of operation 730.

In operation 740, the first-phase module 220 generates the fourth image 340 based on the uncompressed image 300. As noted above, the fourth image 340 may be a low resolution image that represents colors of pixels that have minimum luminance values in each pixel block (e.g., block 301) within the uncompressed image 300. Operation 740 therefore may include determination of the color of the pixel with the lowest luminance value in each pixel block within the uncompressed image 300. Such a determination is shown in FIG. 7 as operation 742, which may be performed as part of operation 740.

In operation 750, the first-phase module 220 generates the fifth image 350 based on the uncompressed image 300. As noted above, the fifth image 350 may be a low resolution image that represents colors of pixels that have maximum luminance values in each pixel block (e.g., block 301) within the uncompressed image 300. Operation 750 therefore may include determination of the color of the pixel with the highest luminance value in each pixel block within the uncompressed image 300. Such a determination is shown in FIG. 7 as operation 752, which may be performed as part of operation 750.

In operation 770, the compression module 250 receives the provided second set 405 of intermediate images (e.g., from the output module 240 as a result of its performance of operation 640) and generates a compressed version of the uncompressed image 300. Generation of the compressed version may be based on the second set 405 of intermediate images, which may include one or more of the fourth image 340, the fifth image 350, and the sixth image 360, as noted above. In some example embodiments, operation 770 generates the compressed version in PVRTC format. Moreover, the compression module 250 may store the compressed version in the database 115 (e.g., for subsequent provision to the device 130 by the texture server machine 120).

As shown in FIG. 8, the method 600 may include operation 810, which may be performed as part (e.g., a precursor task, a subroutine, or a portion) of operation 630, in which the second-phase module 230 generates a sixth image 460 (e.g., as part of the second set 405 of intermediate images). As noted above, the sixth image 460 may include the pixel 462, and this pixel 462 may correspond to the pixel 312 (e.g., a further pixel) in the first image 310.

In operation 810, the second-phase module 230 obtains a luminance value of the pixel 462 in the sixth image 460. This luminance value of the pixel 462 may be obtained by accessing the luminance value of the pixel 312 in the first image 310 and determining (e.g., calculating, quantizing, or any suitable combination thereof) luminance value of the pixel 462 based on the accessed luminance value of the pixel 312. One or more of operations 812, 814, 816, and 818 may be performed as part of operation 810.

In operation 812, the second-phase module 230 determines the minimum luminance value 520 of the luminance range for the pixel 462. The minimum luminance value 520 may be determined based on the second image 320. The second-phase module 230 may determine the minimum luminance value 520 based on one or more minimum luminance values represented in the second image 320 (e.g., based on a linear combination of two or more minimum luminance values). For example, the minimum luminance value 520 may be determined by combining two or more "neighboring" minimum luminance values that correspond to pixel blocks adjacent to the block 301, as represented in the second image 320, as noted above. In some example embodiments, the second-phase module 230 linearly combines four neighboring minimum luminance values (e.g., from pixel blocks above the block 301, below the block 301, to the right of the block 301, and to the left of the block 301). In certain example embodiments, the second-phase module 230 linearly combines two neighboring minimum luminance values (e.g., from pixel blocks diagonally above and left of the block 301, and diagonally below and right of the block 301).

In operation 814, the second-phase module 230 determines the maximum luminance value 530 of the luminance range for the pixel 462. The maximum luminance value 530 may be determined based on the third image 330. The second-phase module 230 may determine the maximum luminance value 530 based on one or more maximum luminance values represented in the third image 330 (e.g., based on a linear combination of two or more maximum luminance values). For example, the maximum luminance value 530 may be determined by combining two or more "neighboring" maximum luminance values that correspond to pixel blocks adjacent to the block 301, as represented in the third image 330. In some example embodiments, the second-phase module 230 linearly combines four neighboring maximum luminance values (e.g., from pixel blocks above the block 301, below the block 301, to the right of the block 301, and to the left of the block 301). In certain example embodiments, the second-phase module 230 linearly combines two neighboring maximum luminance values (e.g., from pixel blocks diagonally above and left of the block 301, and diagonally below and right of the block 301).

In operation 816, the second-phase module 230 divides the luminance range of the pixel 462 into equally spaced values (e.g., between the minimum luminance value 520 and a maximum luminance value 530). For example, the luminance range may be divided into four equally spaced values. This may have the effect of enabling the luminance value of the pixel 312 to be quantized and expressible as a two-bit value.

In operation 818, the second-phase module 230 quantizes the luminance value of the pixel 312 from the first image 310 to a nearest value among the equally spaced values that subdivide the luminance range for the pixel 462 (e.g., as determined in operation 816). That is, the second-phase module 230 may find closest luminance value to the actual luminance value of the pixel 312 among equally spaced values in the luminance range for the pixel 462. As noted above, the sixth image 460 may be monochromatic (e.g., grayscale), and it may therefore be sufficient to determine only the luminance value of each pixel (e.g., pixel 462) in the sixth image 460. The remainder of the pixels in the sixth image 460 may be processed in a manner similar to that described herein for the pixel 462.

According to various example embodiments, one or more of the methodologies described herein may facilitate generation of intermediate images for use as input data in one or more compression algorithms. Moreover, one or more of the methodologies described herein may facilitate generation of intermediate textures for compressing an uncompressed texture. Hence, one or more of the methodologies described herein may facilitate efficient and lightweight production and communication of compressed images, including compressed textures for computer graphics applications (e.g., gaining software).

When these effects are considered in aggregate, one or more of the methodologies described herein may obviate a need for certain efforts or resources that otherwise would be involved in compressing images and communicating compressed images. Efforts expended by a user or a system in generating and delivering compressed images may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
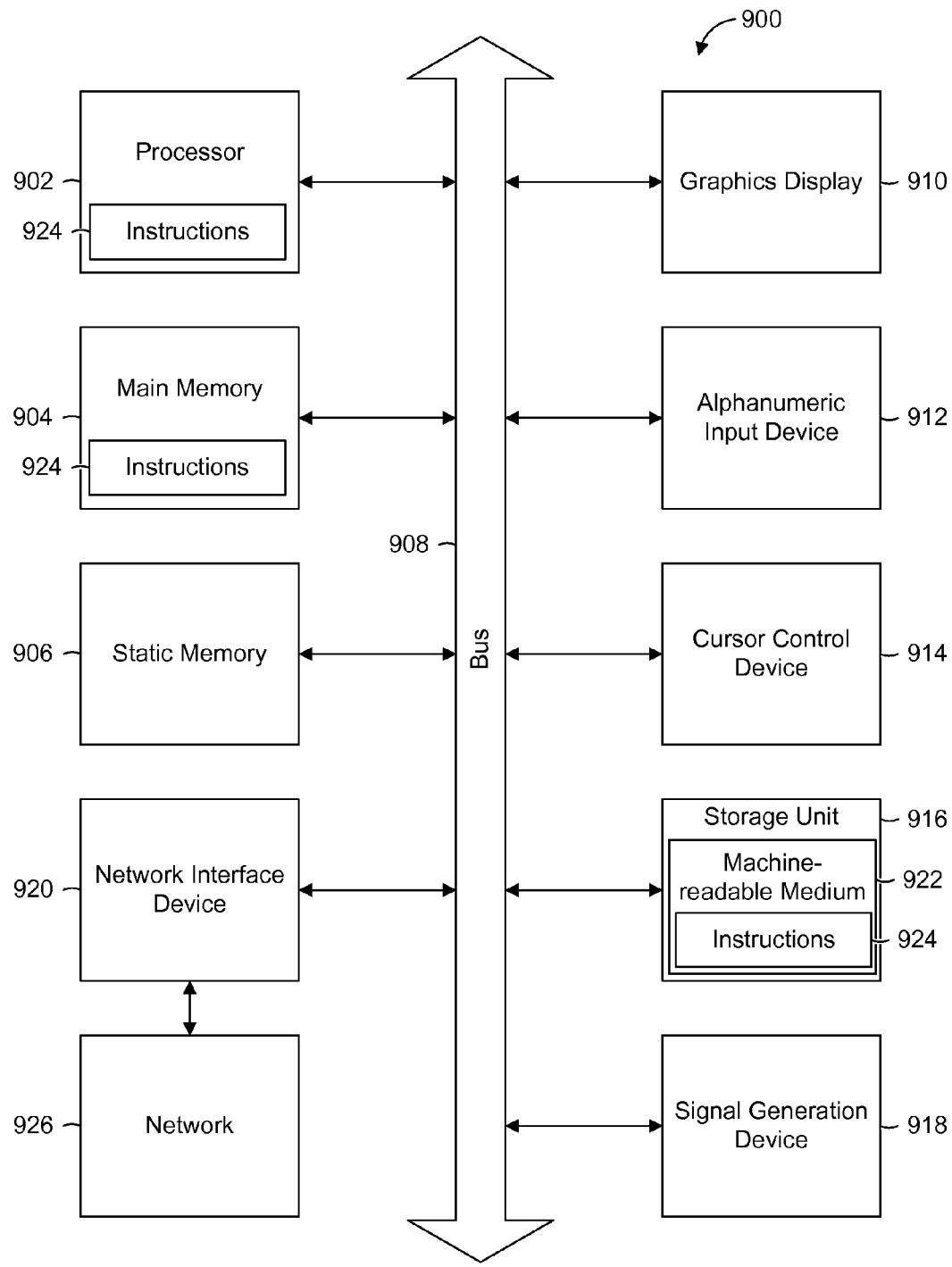
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    accessing an uncompressed image that includes blocks of pixels;
    by a first-phase module comprising one or more processors of a machine, generating a first image that represents colors of pixels that have minimum luminance values in their respective blocks of pixels in the uncompressed image,
    by the first phase module comprising one or more processors of the machine, generating a second image that represents colors of pixels that have maximum luminance values in their respective blocks of pixels in the uncompressed image;

by a second-phase module comprising one or more processors of the machine, generating a third image, the third image being generated based on a fourth image that represents luminance values of pixels in the compressed image, a fifth image that represents minimum luminance values in the blocks of pixels in the uncompressed image, and a sixth image that represents maximum luminance values in the blocks of pixels in the uncompressed image; and providing the first image, the second image, and the third image to a compression engine configured to generate a compressed version of the uncompressed image.

2. The method of claim 1, wherein:
the uncompressed image is a texture map; and
the provided first, second, and third images are sufficient input for the compression engine to generate a compressed version of the texture map.

3. The method of claim 1, further comprising:
by the compression engine, generating the compressed version of the uncompressed image based on the provided first, second, and third images.

4. The method of claim 3, wherein:
the generating of the compressed version of the uncompressed image generates the compressed version in PowerVR Texture Compression (PVRTC) format.

5. The method of claim 1, wherein:
the blocks of pixels in the uncompressed image include multiple 4×4 blocks of pixels in the uncompressed image; and
the generating of the first and second images is based on the multiple 4×4 blocks of pixels in the uncompressed image.

6. The method of claim 1, further comprising:
generating the fourth image from color space triplets of each pixel in the uncompressed image; and
the generated fourth image is monochromatic.

7. The method of claim 6, wherein:
the color space triplets include red, green, and blue values; and
the generating of the fourth image includes summing the red, green, and blue values of each pixel in the uncompressed image.

8. The method of claim 1, further comprising:
generating the fifth image by calculating a minimum luminance value for each block of pixels among the blocks of pixels in the uncompressed image.

9. The method of claim 1, further comprising
generating the sixth image by calculating a maximum luminance value for each block of pixels among the blocks of pixels in the uncompressed image.

10. The method of claim 1, wherein:
the generating of the first image includes determining a color of a pixel with a lowest luminance value within a block of pixels among the blocks of pixels in the uncompressed image.

11. The method of claim 1, wherein:
the generating of the second image includes determining a color of a pixel with a highest luminance value within a block of pixels among the blocks of pixels in the uncompressed image.

12. The method of claim 1, wherein:
the generating of the third image includes determining a luminance value of a pixel of the third image based on a luminance range in which a lowest luminance value of the luminance range is determined based on the fifth image.

13. The method of claim 1, wherein:
the generating of the third image includes determining a luminance value of a pixel of the third image based on a luminance range in which a highest luminance value of the luminance range is determined based on the sixth image.

14. The method of claim 1, wherein:
the generating of the third image includes determining a luminance value of the pixel of the third image based on a corresponding luminance value of a corresponding pixel in the fourth image.

15. The method of claim 1, wherein:
the generating of the third image includes determining a luminance value of a pixel of the third image based on a luminance range that corresponds to the pixel; and
the determining of the luminance value of the pixel includes dividing the luminance range that corresponds to the pixel into equally spaced values.

16. The method of claim 1, wherein:
the generating of the third image includes determining a luminance value of a pixel of the third image based on a luminance range that corresponds to the pixel; and
the determining of the luminance value of the pixel includes quantizing a corresponding luminance value of the corresponding pixel in the fourth image to a nearest value among equally spaced values within the luminance range that corresponds the pixel.

17. A non-transitory machine-readable storage medium comprising instructions that, when executed by one or more processors of a machine, cause the machine to perform operations comprising:
accessing an uncompressed image that includes blocks of pixels;
by a first-phase module comprising one or more processors of the machine, generating a first image that represents colors of pixels that have minimum luminance values in their respective blocks of pixels in the uncompressed image,
by the first phase module comprising one or more processors of the machine, generating a second image that represents colors of pixels that have maximum luminance values in their respective blocks of pixels in the uncompressed image;
by a second-phase module comprising one or more processors of the machine, generating a third image, the third image being generated based on a fourth image that represents luminance values of pixels in the compressed image, a fifth image that represents minimum luminance values in the blocks of pixels in the uncompressed image, and a sixth image that represents maximum luminance values in the blocks of pixels in the uncompressed image; and
providing the first image, the second image, and the third image to a compression engine configured to generate a compressed version of the uncompressed image.

18. The non-transitory machine-readable storage medium of claim 17, wherein the operations further comprise:
by the compression engine, generating the compressed version of the uncompressed image based on the provided first, second, and third images.

19. A system comprising:
an access module comprising one or more processors and configured to access an uncompressed image that includes blocks of pixels;

a first-phase module comprising one or more processors and configured to:
  generate a first image that represents colors of pixels that have minimum luminance values in their respective blocks of pixels in the uncompressed image; and
  generate a second image that represents colors of pixels that have maximum luminance values in their respective blocks of pixels in the uncompressed image;
a second-phase module comprising one or more processors and configured to generate a third image, the third image being generated based on a fourth image that represents luminance values of pixels in the compressed image, a fifth image that represents minimum luminance values in the blocks of pixels in the uncompressed image, and a sixth image that represents maximum luminance values in the blocks of pixels in the uncompressed image; and
an output module comprising one or more processors and configured to provide the first image, the second image, and the third image to a compression engine configured to generate a compressed version of the uncompressed image.

20. The system of claim 19, further comprising:
the compression engine comprising one or more processors and configured to generate the compressed version of the uncompressed image based on provided first, second, and third images.

\* \* \* \* \*